United States Patent
Delfini et al.

(10) Patent No.: US 7,047,651 B2
(45) Date of Patent: May 23, 2006

(54) HAND-HELD COMPASS SAW

(75) Inventors: Stefano Delfini, Bettlach (CH); Hans Kaiser, Leuzigen (CH); Paul Stoss, Flumenthal (CH); Urs Ruepp, Solothurn (CH)

(73) Assignee: Scintilla AG, Solothurn (CH)

( * ) Notice: Subject to any disclaimer, the term of this patent is extended or adjusted under 35 U.S.C. 154(b) by 0 days.

(21) Appl. No.: 10/501,051

(22) PCT Filed: Apr. 11, 2003

(86) PCT No.: PCT/EP03/03802

§ 371 (c)(1),
(2), (4) Date: Jul. 9, 2004

(87) PCT Pub. No.: WO03/101657

PCT Pub. Date: Dec. 11, 2003

(65) Prior Publication Data

US 2005/0076509 A1 Apr. 14, 2005

(30) Foreign Application Priority Data

Jun. 3, 2002 (DE) .......................... 202 05 553 U

(51) Int. Cl.
*B27B 11/02* (2006.01)
(52) U.S. Cl. .................... 30/394; 30/371; 30/392
(58) Field of Classification Search ......... 30/392–394, 30/369, 276, 371; 83/420, 661; 474/167, 474/148, 174
See application file for complete search history.

(56) References Cited

U.S. PATENT DOCUMENTS 5,644,847 A   7/1997   Odendahl et al.

FOREIGN PATENT DOCUMENTS

| DE | 197 29 745 A | | 1/1999 |
| GB | 2 300 145 A | | 10/1996 |
| GB | 2300145 A | * | 10/1996 |
| GB | 2 322 328 A | | 8/1998 |

* cited by examiner

*Primary Examiner*—Timothy V. Elay
*Assistant Examiner*—Issac Hamilton
(74) *Attorney, Agent, or Firm*—Michael J. Striker

(57) ABSTRACT

A power compass saw with a housing that accommodates a lifting rod for the up and down movement of a longitudinal saw blade attached thereto, has a toothed side and a saw blade back and with a guide roller which supports the saw blade back and has a central groove into which the saw blade extends with its saw blade back and is guided therein, the central circumferential groove has tapered groove sides with a 5° taper, the saw blade back has a straight portion and an end beveled portion with beveled edges having a 7° taper at both sides, the saw blade back has diametrically opposed edges provided at a transition from the straight portion to the beveled portion, and the saw blade back has a width which is measured between the diametrically opposed edges and is greater than a width of a bottom of the circumferential groove.

3 Claims, 5 Drawing Sheets

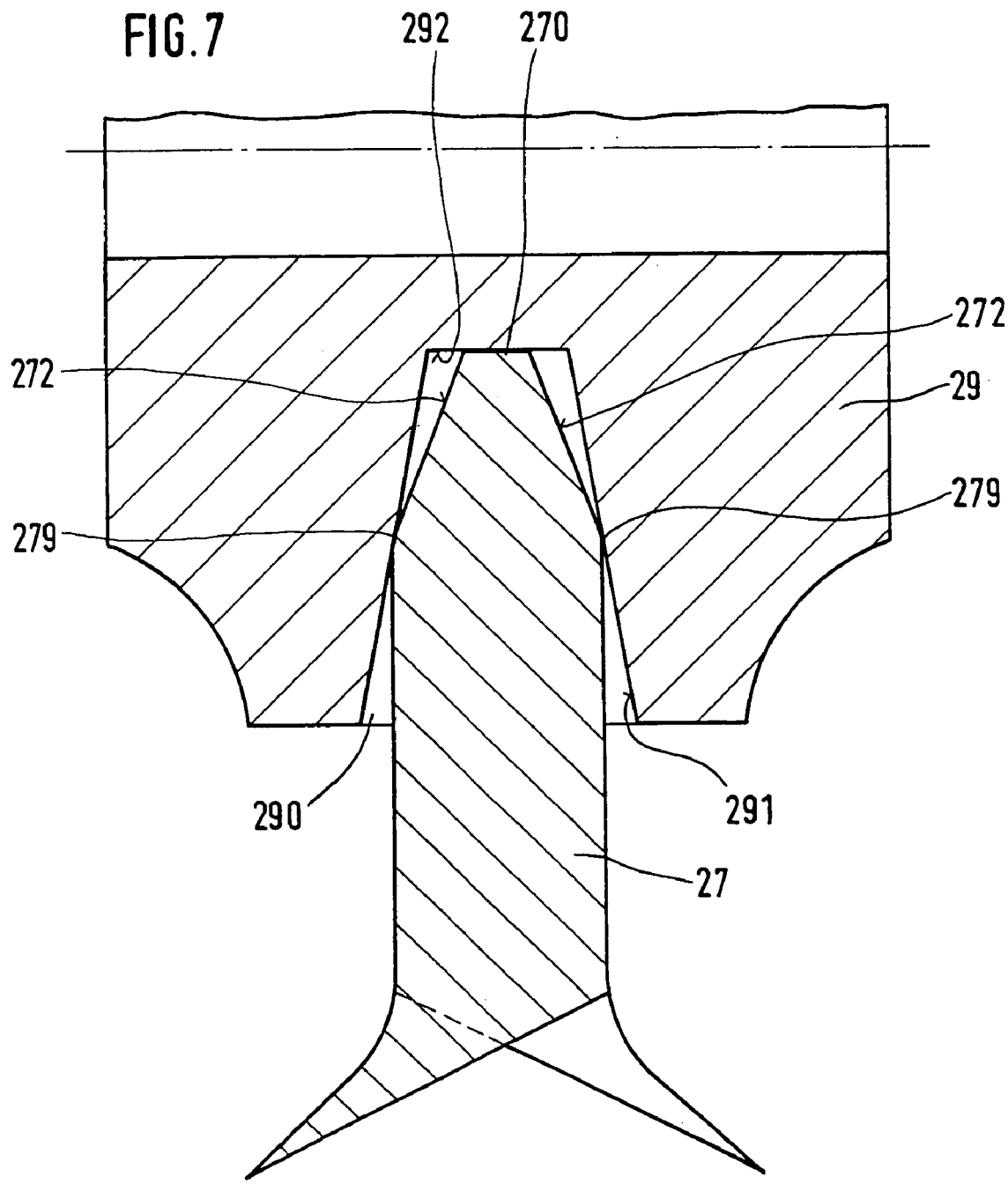

HAND-HELD COMPASS SAW

BACKGROUND OF THE INVENTION

The present invention is directed to a power compass saw.

A power compass saw is known from GB patent 23 223 28, the reciprocating roller of which has a conical, central circumferential groove in which the saw blade back of a saw blade moved up and down in the power compass saw is to be supported.

Compass saw blades are also known, the side surfaces of which are tapered toward the saw blade back at an acute angle, so that they are guided—laterally in two dimensions—in the reciprocating roller of the aforementioned power compass saw and are therefore relatively well supported.

With particularly narrow compass saw blades, there is a danger, however, that they are unable to be supported on both sides simultaneously in the groove—which is too wide—of the reciprocating roller, thereby resulting in the danger that the saw cut will be unclean.

SUMMARY OF THE INVENTION

It is therefore an object of the present invention to provide a power compass saw, which eliminates the disadvantages of the prior art.

The present invention has the advantage that the compass saw blades of the compass saw according to the invention are configured with little outlay such that they have identical, minimized play on the sides, independently of the thickness of the saw blade. The saw blades are no longer guided solely at the saw blade back, but primarily at the side surfaces. As a result, the tendency for the saw blade to saw untrue is greatly minimized.

Due to the fact that the taper in the back region of the saw blades is formed in a noncutting manner, and is stamped in particular, it is particularly wear-proof.

Due to the fact that the guide roller serves as reciprocating stroke-support roller, it acts together with the saw blade having a particular configuration to bring about an improved sawing advancement with reduced cutting channel width, because the saw blade is guided more stiffly and does not undergo torsional movement.

Due to the fact that the saw blade back, measured at the taper and/or cone edges, is wider than the groove bottom of the circumferential groove—in particular is not wider than 1.5 mm—the saw blade back is prevented from resting directly on the groove bottom, and sole lateral support of the saw blade is ensured.

Due to the fact that the groove sides of the central circumferential groove in the guide roller have a 5° taper, the saw blades having a 7° taper on the back are guided laterally securely.

Due to the fact that the guide roller has a diameter of 10 to 25 mm and the circumferential groove is as deep as possible, the lateral guidance of all compass saw blade types known heretofore having backs with a 7° taper is very secure.

Due to the fact that the groove bottom of the circumferential groove is not as wide as the saw blade back, and is not wider than 1.4 mm in particular, the power compass saw can be used to saw in a particularly controlled, reliable and precise manner.

The present invention is explained hereinbelow with reference to an associated drawing.

BRIEF DESCRIPTION OF THE DRAWINGS

FIG. 7 is an enlarged schematic cross section of the guide roller with saw blade guided therein.

DESCRIPTION OF THE PREFERRED EMBODIMENT

Figure 1:
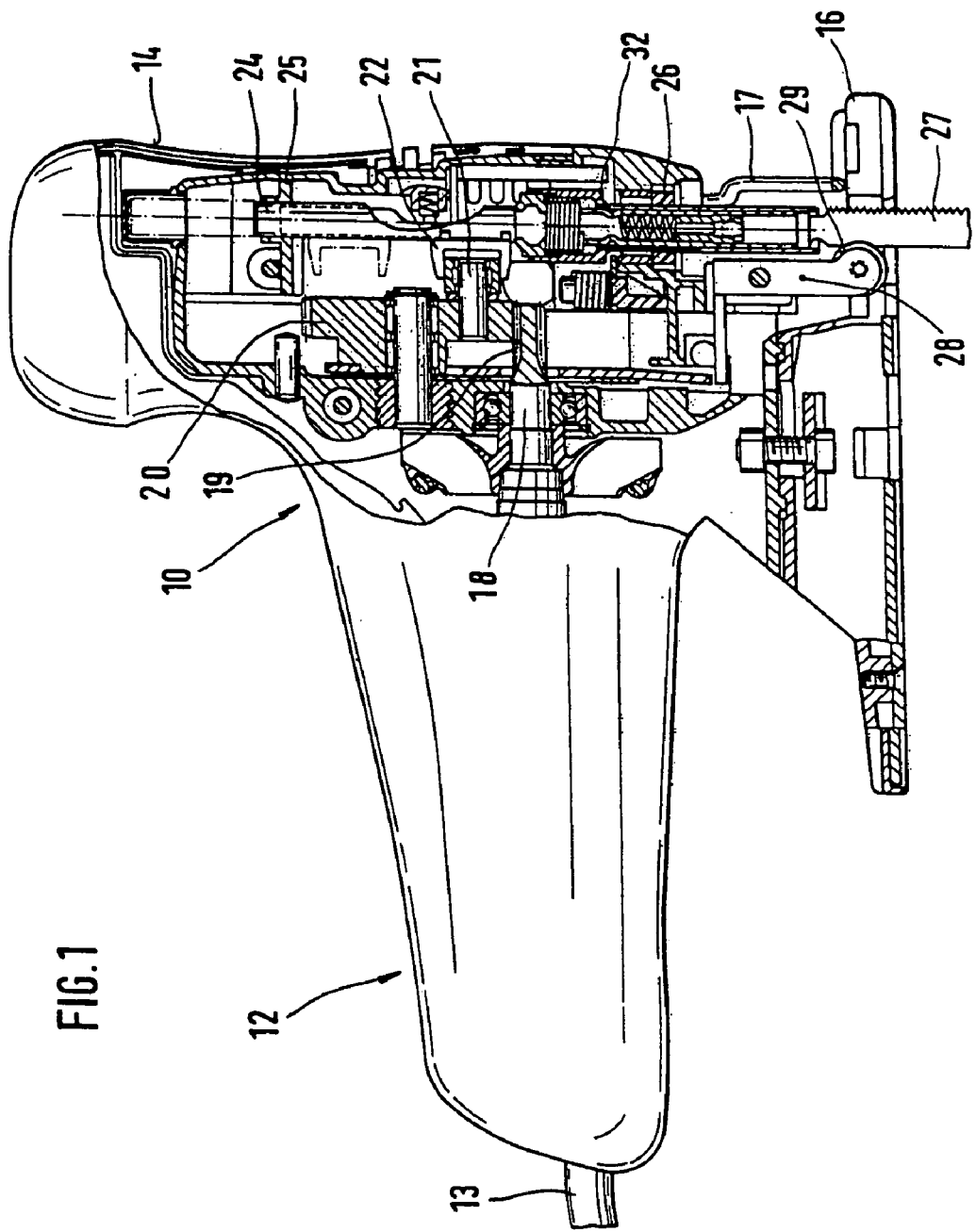
FIG. 1 shows a side view of the power compass saw according to the invention.

A compass saw 10 with a motor housing 12 serving as handle is shown in FIG. 1, the motor housing extending parallel with the feed direction and out of the back region of which an electrical cable 13 extends.

In the front region, compass saw 10 includes a gearbox case 14 that is flange-mounted to motor housing 12, the gearbox case, together with motor housing 12, being diametrically opposed—in a manner that allows the angle to be adjusted—to a base plate 16 for making mitre cuts. A rod-like mechanism for providing protection against accidental contact 17 is rigidly situated between gearbox case 14 and base plate 16 on gearbox case 14, the mechanism preventing accidental contact with a saw blade 27 from the front in the area of its saw teeth.

A motor, which is not shown in greater detail, imparts a rotary movement to its motor shaft 18, which ends in a shaft pinion 19 and extends into gearbox case 14. A gear wheel 20 meshes with shaft pinion 19, the gear wheel being supported such that its axis is parallel with motor shaft 18 and driving an eccentric pin in a rotary manner, the pin serving as crank 21 and meshing in a link-like sliding member 22 that is connected to a lifting rod 24 in a fixed manner.

Lifting rod 24 is supported in an upper lifting rod guide 25 and, with its lower region, in a lower lifting rod guide 26 in a gliding manner and is guided in a straight line. A reciprocating lever 28 located at the bottom of gearbox case 14 is driven in a reciprocating manner by gear wheel 20 in a manner that is not explained further, whereby its guide roller 29, serving a reciprocating roller, bears against the back 270 of saw blade 27 and imparts to it, together with lifting rod 24, a reciprocating stroke that moves back and forth in parallel with the feed direction.

Mounted on the lower end of lifting rod 24 is a clamping sleeve 32 for accommodating and clamping saw blade 27. Saw blade 27 has a back 270 that is stamped in the shape of a "V", the back being centered in the circumferential V-groove of guide roller 29, with its beveled edges 272 supported on both sides.

Figure 2:
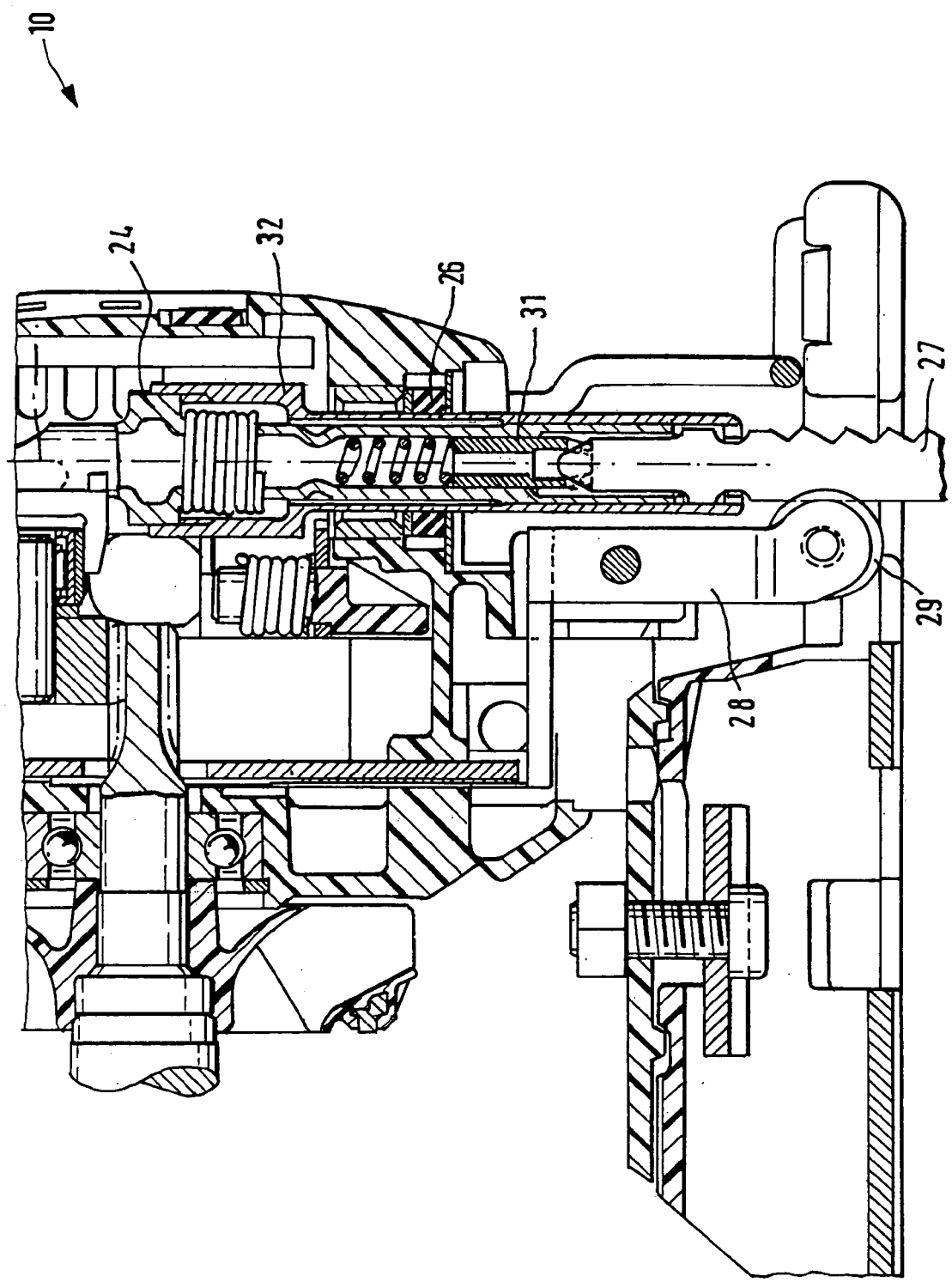
FIG. 2 is an enlarged section of a longitudinal cut according to FIG. 1.

FIG. 2 shows an enlarged section according to FIG. 1 in the area of guide roller 29. The details listed hereinabove will not be repeated here.

Figure 3:
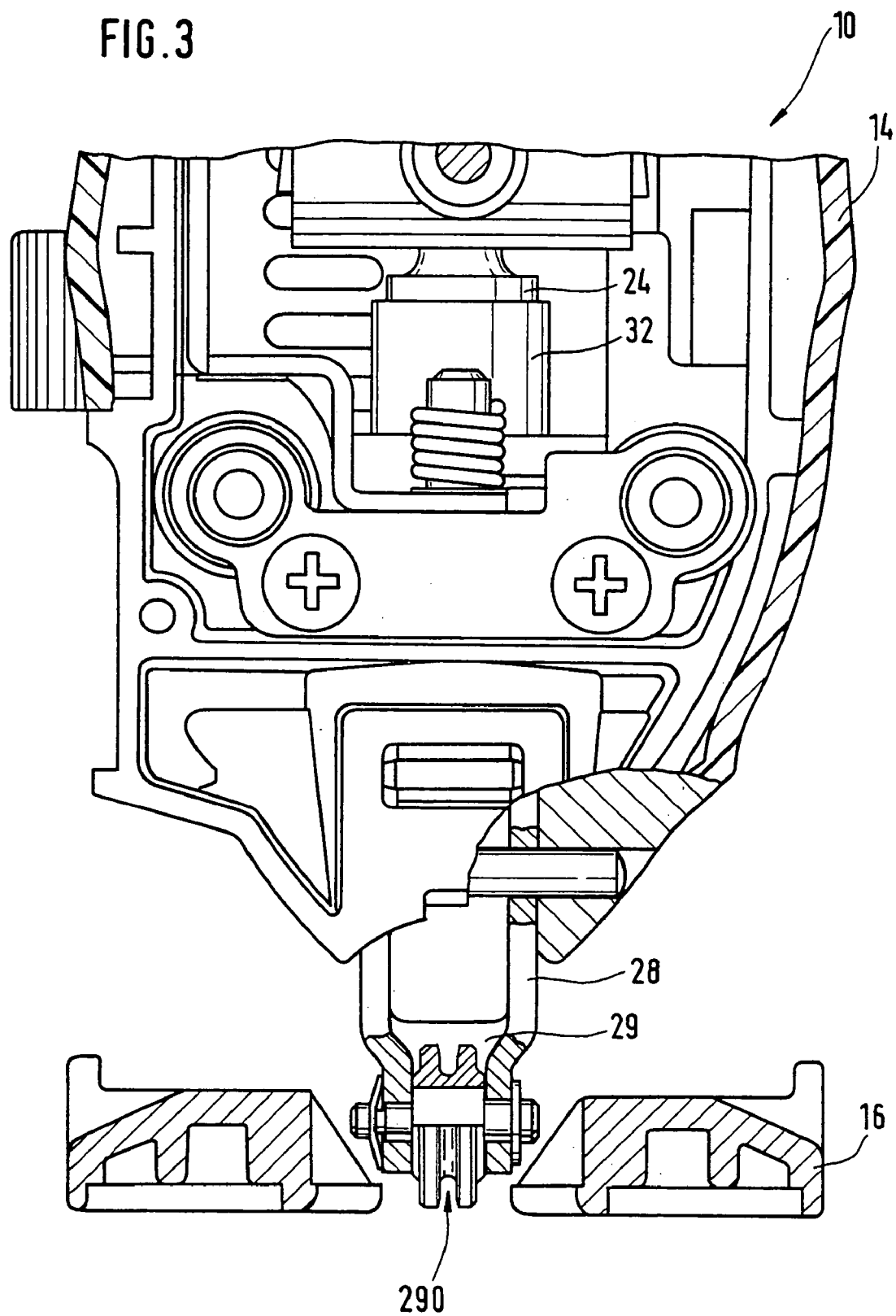
FIG. 3 is an enlarged section of the cross section according to FIG. 1 in the area of the guide roller.

FIG. 3 shows a vertical cross section of compass saw 10 according to FIG. 1, whereby the cutting plane extends through reciprocating lever 28 and guide roller 29. As a result, the configuration of guide roller 29 with a particular conical circumferential groove 290 is clearly visible. The remaining reference numerals, which were explained previously for FIGS. 1 and 2, will not be discussed here again.

Figure 4:
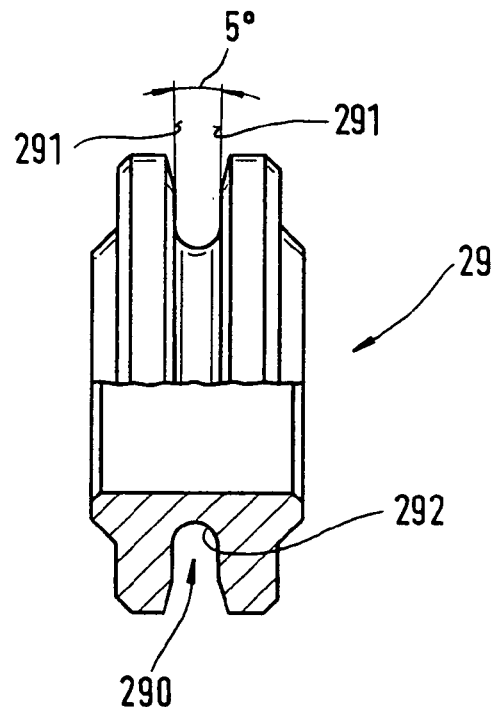
FIG. 4 is a partial cross section of the guide roller alone.

FIG. 4 shows guide roller 29 alone in a partial sectional view, whereby circumferential groove 290 is particularly visible, in particular its sides 291, which tilt toward each other at an overall angle of 5 degrees. Groove bottom 292 is shown as well; it is slightly narrower than the greatest width B of saw blade back 270 of compass saw blade 27.

Figure 5:
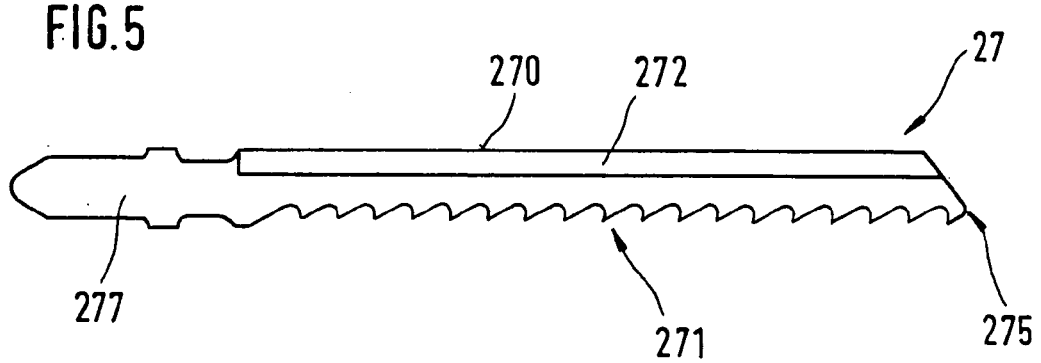
FIG. 5 is a side view of the saw blade according to the invention.

FIG. 5 shows a side view of compass saw blade 27 with saw blade back 270 and toothed side 271 on the opposite side thereof. The back region of saw blade back 270 is stamped in the shape of a "V", so that two beveled edges 272 are produced, the beveled edges extending in a tapering manner toward saw blade back 270.

As seen on the right, saw blade 27 has a saw blade tip 275 and, as seen on the left, it has a clamping end 277, with which it is releasably clampable in clamping sleeve 32.

Figure 6:
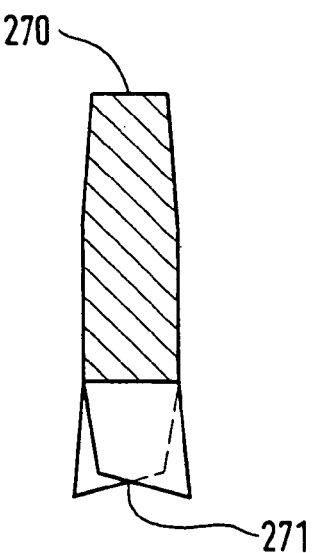
FIG. 6 is a cross section of the saw blade according to the invention.

FIG. 6 shows an enlarged cross section of saw blade 27, whereby beveled edges 272 that taper toward each other at a 7-degree angle are clearly visible.

FIG. 7 shows a semi-cross section of guide roller 29 with its circumferential groove 290 and saw blade 27 supported therein. This particularly narrow saw blade 27 bears, as an exception, against groove bottom 292 with its saw blade back 270. At the same time, it bears against the lateral groove sides 291 of circumferential groove 290 of guide roller 29 with diametrically opposed edges 279. Edges 279 are formed on saw blade 27 at the transition from its side surface to its beveled edge 272. As a result, a lateral shift and/or torsional movement of saw blade 27 during sawing is prevented, and a particularly correct course of cutting during sawing is ensured.

With wider/stronger saw blades, their saw blade backs 270 do not come to bear against groove bottom 292 of circumferential groove 290; instead, they bear against groove sides 291 of circumferential groove 290 only with their edges 279.

What is claimed is:

1. A power compass saw (10) with a housing (12) that accommodates a lifting rod for the up and down movement of a longitudinal saw blade (27) attached thereto, the saw blade having a toothed side and a saw blade back (270), and with a guide roller (29) which serves as reciprocating stroke-support roller, supports the saw blade back (270) and has a central circumferential groove (290) into which the saw blade extends with its saw blade back (270) and is guided therein, whereby the sides of the circumferential groove (290) are tapered wherein the saw blade back (270) of the saw blade is designed with a 7° conical configuration and/or taper on both sides defining edges, so that it tapers toward the saw blade back (270) and is capable of being supported in two dimensions in the circumferential groove (290), the groove sides (291) of which have a 5° taper,
   wherein the saw blade back (270) measured at cone and/or taper edges is wider than the groove bottom (292) of the circumferential groove (290) of the guide roller (29), no wider than 1.5 mm,
   wherein the groove bottom (292) is less wide than the saw blade back (270), not wider than 1.4 mm, and
   wherein the guide roller (29) has a diameter of 10 to 25 mm, and the groove is as deep as possible, at least 5 mm deep.

2. The power compass saw as recited in claim 1, wherein the taper of the saw blade back (270) is formed in a noncutting manner, and is stamped.

3. A power compass saw (10) with a housing (12) that accommodates a lifting rod for the up and down movement of a longitudinal saw blade (27) attached thereto, the saw blade having a toothed side and a saw blade back (270) and with a guide roller (29) which supports the saw blade back (270) and has a central groove (290) into which the saw blade extends with its saw blade back (270) and is guided therein, wherein the central circumferential groove (290) has tapered groove sides (291) with a 5° taper, and wherein the saw blade back (270) has a straight portion and an end beveled portion with beveled edges (272) having a 7° taper at both sides, wherein the saw blade back (270) has diametrically opposed edges provided at a transition from the straight portion to the beveled portion (279), and wherein the saw blade back (270) has a width which is measured between the diametrically opposed edges (279) and is greater than a width of a bottom (292) of the circumferential groove (290).

* * * * *